US006995947B2

(12) United States Patent
Korkowski et al.

(10) Patent No.: US 6,995,947 B2
(45) Date of Patent: Feb. 7, 2006

(54) REDIRECTING FLOW TO REDUCE DISTURBANCES UPON AN ACTUATOR ARM OR HEAD-GIMBAL ASSEMBLY OF A DISC DRIVE

(75) Inventors: Kurt James Korkowski, Carver, MN (US); James Eiji Kaneko, Oakdale, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 158 days.

(21) Appl. No.: 09/823,677

(22) Filed: Mar. 30, 2001

(65) Prior Publication Data

US 2001/0036037 A1    Nov. 1, 2001

Related U.S. Application Data

(60) Provisional application No. 60/193,686, filed on Mar. 31, 2000.

(51) Int. Cl.
*G11B 33/14* (2006.01)
(52) U.S. Cl. .................................................. 360/97.03
(58) Field of Classification Search ............. 360/97.02, 360/97.03
See application file for complete search history.

(56) References Cited

U.S. PATENT DOCUMENTS

| 3,731,291 | A | * | 5/1973 | Walsh ...................... 360/97.03 |
| 4,282,554 | A | * | 8/1981 | Ho et al. ................. 360/97.02 |
| 4,581,668 | A | * | 4/1986 | Campbell ..................... 369/72 |
| 4,692,829 | A | | 9/1987 | Campbell |
| 4,710,830 | A | | 12/1987 | Imai et al. |
| 4,780,776 | A | | 10/1988 | Dushkes |
| 5,305,164 | A | | 4/1994 | Elsing |
| 5,517,372 | A | | 5/1996 | Shibuya et al. |
| 5,602,700 | A | | 2/1997 | Viskochil et al. |
| 5,696,649 | A | | 12/1997 | Boutaghou |
| 5,898,545 | A | | 4/1999 | Schirle |
| 5,956,203 | A | * | 9/1999 | Schirle et al. ........... 360/97.03 |
| 6,097,568 | A | | 8/2000 | Ekhoff |

* cited by examiner

*Primary Examiner*—David Davis
(74) *Attorney, Agent, or Firm*—Fellers, Snider, et al.

(57) ABSTRACT

A flow-induced disturbance upon an actuator arm is reduced. A gas flow generated by a rotation of a disc is received and passed along a surface. The surface is mechanically isolated from the actuator arm. The surface redirects the received flow to include a substantial inward radial component so as to be better aligned along a leading edge of the actuator arm.

3 Claims, 3 Drawing Sheets

REDIRECTING FLOW TO REDUCE DISTURBANCES UPON AN ACTUATOR ARM OR HEAD-GIMBAL ASSEMBLY OF A DISC DRIVE

CROSS REFERENCE TO RELATED APPLICATION

This application claims priority to U.S. Provisional Application No. 60/193,686 filed Mar. 31, 2000.

FIELD OF THE INVENTION

This invention relates generally to the field of data handling devices, and more particularly to directing gas flow within electromechanical data storage devices to permit more accurate transducer positioning.

BACKGROUND OF THE INVENTION

Computers commonly use disc drives or tape drives to store large amounts of data in a form that can be readily accessed by a user. A typical disc drive generally includes a stack of vertically spaced magnetic discs that are rotated at high speed by a spindle motor. The surface of each disc is divided into a series of concentric, radially spaced data tracks in which the data are stored in the form of magnetic flux transitions. Each data track is divided into a number of data sectors that store data blocks of a fixed size.

Data are typically stored and accessed on the discs by an array of read/write heads mounted to a rotary actuator assembly, or "E-block." Typically, the E-block includes a plurality of actuator arms which project outwardly from an actuator body to form a stack of vertically spaced actuator arms. The stacked discs and arms are configured so that the surfaces of the stacked discs are accessible to the heads mounted on the complementary stack of actuator arms.

Head wires included on the E-block conduct electrical signals from the heads to a flex circuit, typically, which in turn conducts the electrical signals to a flex circuit bracket mounted to a disc drive basedeck. For a discussion of some modern E-block assembly techniques, see U.S. Pat. No. 5,404,636 entitled "Method of Assembling a Disk Drive Actuator" issued Apr. 11, 1995 to Frederick M. Stefansky et al., and assigned to the assignee of the present invention.

The actuator body pivots about a cartridge bearing assembly which is mounted to the disc drive housing at a position closely adjacent the outer extreme of the discs. The actuator assembly includes a voice coil motor which enables the actuator arms and the heads attached thereto to be rotated about the cartridge bearing assembly so that the arms move horizontally (i.e. in a plane parallel to the surfaces of the discs) to selectively position a head adjacent to a preselected data track.

The voice coil motor includes a coil mounted radially outwardly from the cartridge bearing assembly, the coil being immersed in the magnetic field of a magnetic circuit of the voice coil motor. The magnetic circuit comprises one or more permanent magnets and magnetically permeable pole pieces. When current is passed through the coil, an electromagnetic field is established which interacts with the magnetic field of the magnetic circuit so that the coil moves in accordance with the well-known Lorentz relationship. As the coil moves, the actuator body pivots about the pivot shaft and the heads move across the disc surfaces.

Each of the heads is mounted to an actuator arm by a flexure which attaches to the end of the actuator arm. Each head includes an interactive element such as a magnetic transducer which either senses the magnetic transitions on a selected data track to read the data stored on the track, or transmits an electrical signal that induces magnetic transitions on the selected data track to write data to the data track. Air currents are caused by the high speed rotation of the discs. A slider assembly included on each head has an air bearing surface which interacts with the air currents to cause the head to fly at a short distance above the data tracks on the disc surface.

There is a generally recognized trend in the industry to increase track density, making more and more accurate track following necessary. At the same time, increasing disc rotation speeds have resulted in more and more noise energy being transferred to each arm and head-gimbal assembly by wind. This acts as a disturbance having energy distributed across a wide spectrum of frequencies. This makes accurate track following difficult, especially when it includes significant energy at any of the resonance frequencies of the arms. Thus, there is a need for an improved technique for reducing wind-induced disturbances upon arms and head-gimbal assemblies of the disc drive.

The present invention provides a solution to this and other problems, and offers other advantages over the prior art.

SUMMARY OF INVENTION

The present invention is a method of reducing a flow-induced disturbance on an actuator arm of a disc drive. It includes a step of receiving a gas flow generated by a rotation of a first disc of the disc drive. The received flow is guided along a surface mechanically isolated from the actuator arm. The surface redirects the received flow to include a substantial inward radial component so as to be better aligned along a leading edge of the actuator arm, thereby exerting less force upon it.

Optionally, the guiding also increases the turbulence of the flow to a moderate degree just upstream from the actuator, which is believed to make it less likely for structural resonances to develop fully. These and other features and benefits will become apparent upon a review of the following figures and their accompanying detailed description.

DETAILED DESCRIPTION OF THE PREFERRED EMBODIMENTS

Figure 1:
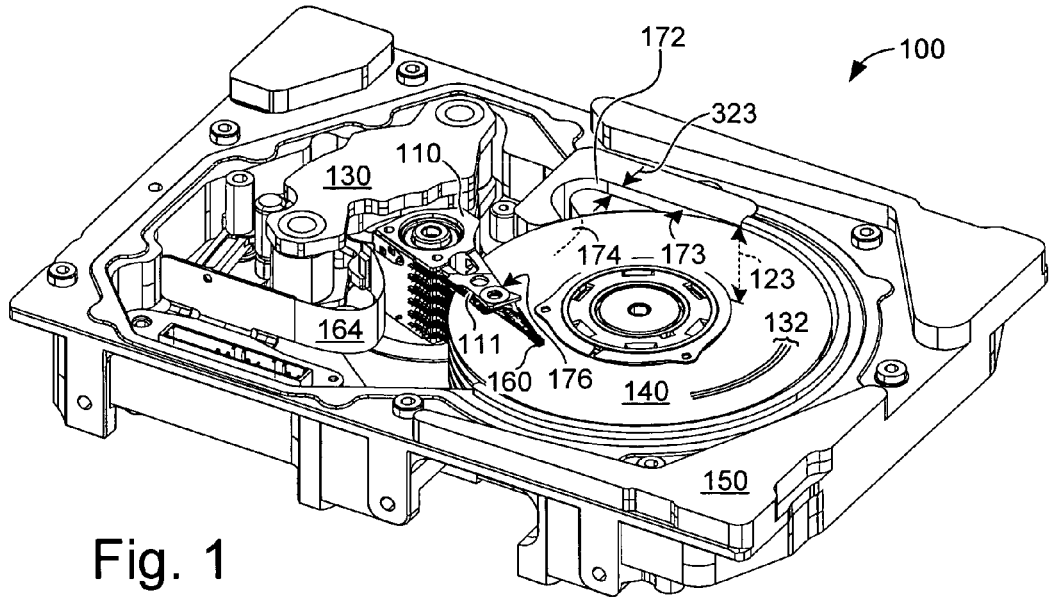
FIG. 1 shows a disc drive configured to implement the present invention.

Referring to the drawings in general, and more particularly to FIG. 1, shown there is a disc drive 100 configured to implement the present invention. Disc drive 100 includes a housing 150 containing several discs 140 in a stack arranged for co-rotation in a conventional manner. Preferably, the discs 140 are each at least 50 mils thick. The cover for the housing (not shown) provides a conventional sealed environment. The top and bottom flat surfaces of each disc 140 each include many thousands of circular tracks 132 containing data. A rotary actuator 110 supports several transducer heads 160 each supported on a respective arm 111 adjacent a respective surface of a disc 140. A conventional voice coil motor 130 controls the position of the actuator 110 so that a selected one of the heads 160 is positioned above a selected track 132. Once the head 160 is following the selected track 132, data can be retrieved from or written to the track 132 via a flex connector 164 through which data signals flow.

The discs 140 spin, counterclockwise as shown, at several thousand revolutions per minute. This causes a wind of hundreds of feet per second to bear upon the leading edge 176 of each actuator arm 111, sometimes causing a flow-induced disturbance upon the actuator arm 111 that makes track following difficult. In prior art configurations, air traveling substantially tangent to the disc circumference could collide with a leading edge of an actuator at angles within 30 degrees of the normal, especially when track following at the innermost track.

According to the present invention, a wind-induced disturbance is reduced by redirecting a portion of the flow inward so that the wind is better aligned along a leading edge of the actuator arm. In the embodiment of FIG. 1, this is accomplished by a J-shaped channel 172 having a uniform width 323 and depth 123. Put another way, so that the channel 172 can accommodate a significant flow, all of the cross sections along the channel have a width 323 greater than R/100, where R is the nominal radius 311 of the disc. Most importantly for present purposes, the J-shaped channel 172 includes a redirecting surface 173 that is mechanically isolated from the actuator arm.

As used herein, a surface is "mechanically isolated" from an actuator arm if the surface is only coupled to the actuator arm through the actuator body. Suitable isolation may be obtained by providing the surface on a structure coupled to the housing 150 or to the body of the actuator 110, for example.

Figure 2:
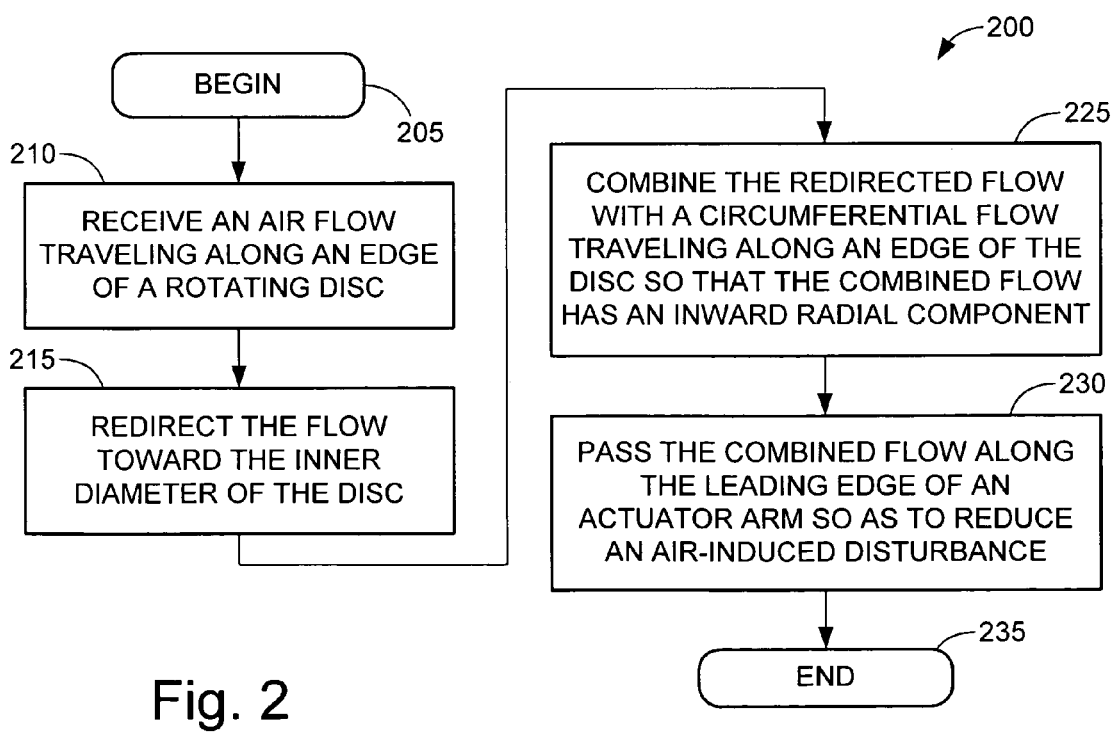
FIG. 2 shows a flowchart of a method of the present invention.

FIG. 2 shows a method 200 of the present invention comprising steps 205 through 235. A flow traveling along an edge of a rotating disc is received 210 and redirected toward the inner diameter of the disc. The redirected flow is then combined with a circumferential flow traveling along an edge of the disc 225. The combined flow (shown in region 174 of FIG. 1) then has a substantial inward radial component. (As used herein, a flow direction has a "substantial" radial component if the flow direction differs from the tangent direction by about 2 degrees or more.)

While the just-combined flow 346 still has a substantial inward radial component, it is passed along the leading edge of each actuator arm so as to reduce a windage-induced disturbance. The combined flow can optionally be permitted to laminarize while the disc carries the flow through about 10–90 degrees of its rotation.

Figure 3:
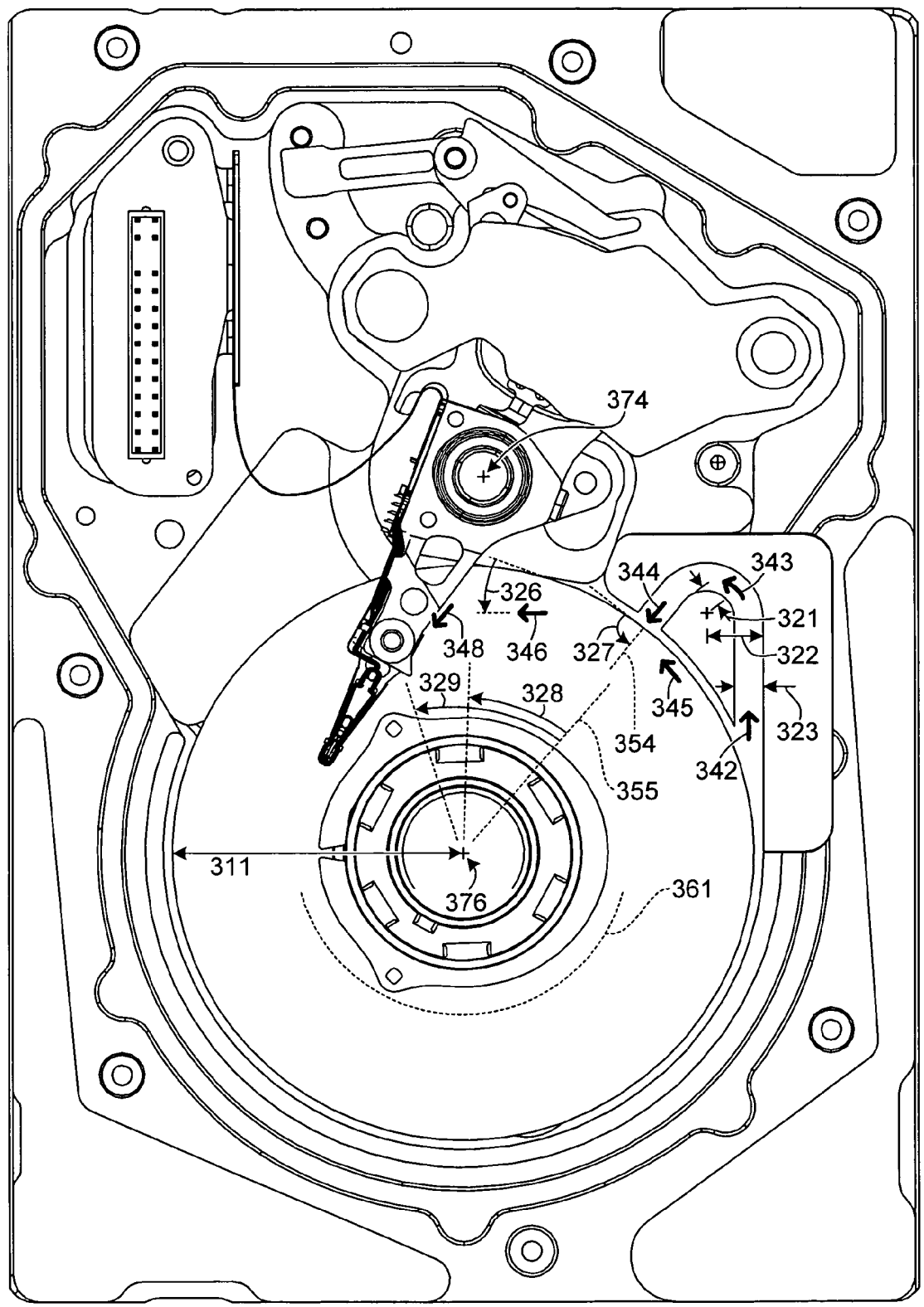
FIG. 3 shows a top view of the disc drive of FIG. 1, showing in more detail how it can perform the method of FIG. 2.

FIG. 3 shows a top view of the disc drive 100 of FIG. 1, highlighting how the disc drive 100 of FIG. 1 can perform the method of FIG. 2. The axis of rotation 374 of the actuator is shown, as is the axis of rotation 376 of the disc stack. Radius 311 is shown explicitly, and radius 355 is shown in part, marking the leading side of the combined flow region 174 (of FIG. 1). Within the half-circle upstream from (i.e. below) radius 355 near the discs, it can be assumed for present purposes that all of the air travels substantially tangent to the rotation. For example, flow 345 flows in a substantially tangent direction. As used herein, "substantially tangent" means within two degrees of being tangent to a centered about axis 376. (In ordinary disc drives, flow very near each disc will actually have a somewhat more outward direction than flow mid-way between successive discs, a centrifugal effect.)

An air flow 342 traveling along the circumference of a disc 140 is initially received at the inlet of the channel 172. The inner radius 321 and the outer radius 322 of the channel 172 have a difference equal to the inlet width 323, so that the channel maintains a nominally constant cross-sectional area along its J-shaped length. Encountering the curved wall 173, the redirected flow 343 therefore maintains a nearly-constant speed even as it is expelled 344. The fastest portion of the expelled flow 344 is directed toward the inner diameter 361 of each disc 140, encountering the tangential flow 345 at an angle 327 of about 90 degrees. In preferred embodiments, the area-averaged injection angle 327 is at least about 30 degrees.

The combined flow 346 has a direction including a substantial inward radial component, as shown by the angle 326 departing from tangent by several degrees. The mixed flow region 174 upstream from each actuator arm 176 is characterized by a substantial inward flow direction component. After rotating with the disc about a travel angle 328 of about 30 to 60 degrees, the combined flow 346 encounters the leading edge 176. A larger travel angle will tend to laminarize the just-combined flow 346 but decrease its inward angle 326. In preferred embodiments, most of the area of the leading edge 176 of the actuator arm 111 comes in contact with the mixed flow 346,348 before the mixed flow travels about an angle 329 of less than 90 degrees.

As the just-combined 346 flow draws very near the leading edge 176, it is redirected again. Part of the just-combined flow 346 travels above and below the actuator arm 176 in manner similar to that of the prior art. More importantly, part of the flow 348 travels along the leading edge 176. Because the combined flow 346 transfers less energy to the actuator arm 111 than an ordinary tangent flow 345 would, especially at a resonance frequency F of the actuator arm, disc drives 100 performing the present method are better able to follow tracks 132 accurately.

Figure 4:
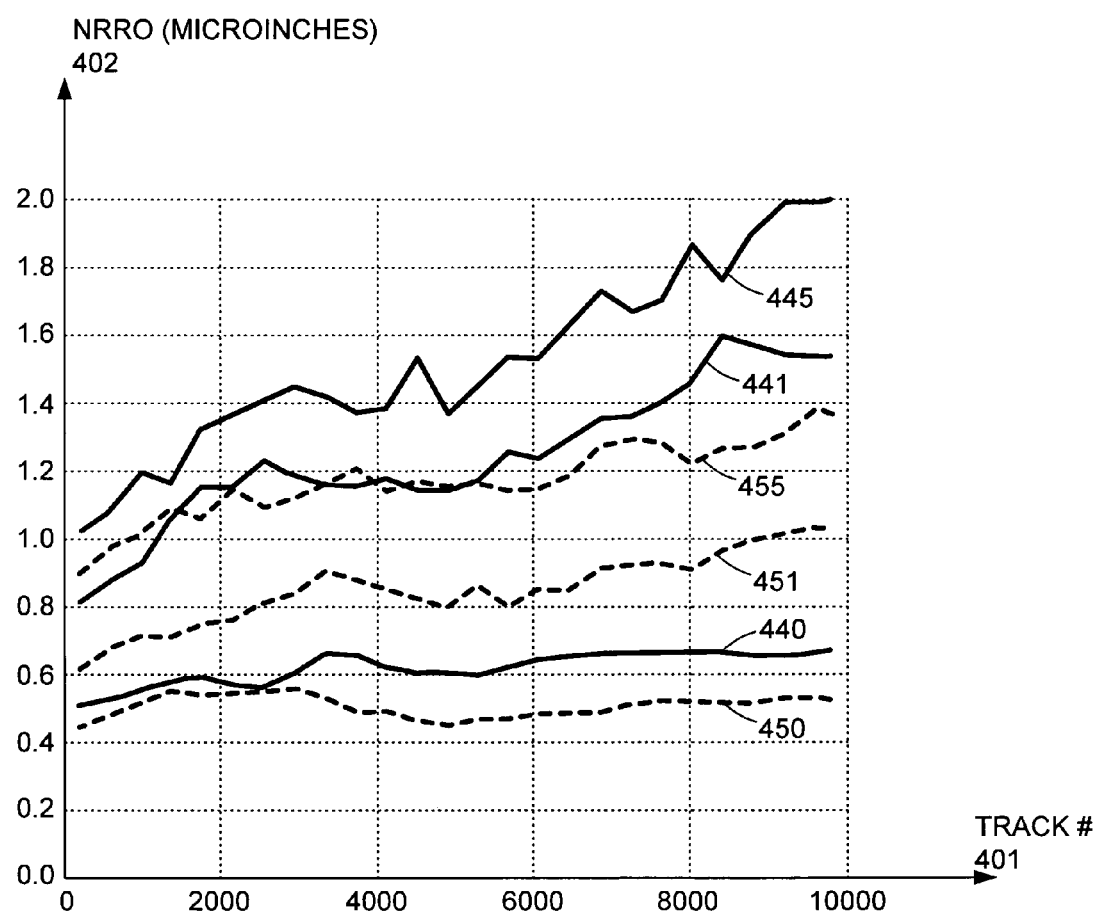
FIG. 4 plots a disturbance indicator as a function of actuator position for various heads, with and without the present invention.

FIG. 4 plots disturbance indicator as a function of actuator position 401. Actuator position 401 is expressed as a track (cylinder) number. The 0th track is at the outer diameter, and the inner diameter is numbered about 10,000. The disturbance indicator is Non-Repeatable Run Out (NRRO) expressed in microinches 402. At each of several measurement cylinders, a position error signal (PES) indicates a measured deviation from an expected radial position many times. These measurements were divided into three groups, each group being used to derive a respective mean and a standard deviation. The means each represent Repeatable Run Out (RRO), which was ignored for present purposes. The standard deviations, expressed in microinches, were averaged to obtain the present indicator of NRRO 402.

The disc drive from which the data of FIG. 4 were gathered had five discs, each with two surfaces. The heads were conventionally numbered 0 through 9. Before the method of the present invention was performed within the drive, head 0 resulted in NRRO indicator 440, head 1 resulted in NRRO indicator 441, and head 5 resulted in NRRO indicator 445. This reflects the fact that heads near the top and bottom disc generally suffered worse NRRO than heads near the middle disc. It is believed that stationary surfaces above and below the disc stack served to dampen the flow impinging upon the actuator arms near the top and bottom, especially those coupled to heads 0 and 9. This is supported by the fact that the worst case NRRO was always measured near the inner diameter (on the right side of FIG. 4) for the heads positioned between discs (i.e. heads 1 through 8).

After the disc drive was reconfigured to perform the present method, head 0 showed a greatly reduced indication 450 of NRRO. Heads 1 and 5 also showed greatly reduced NRRO indications 451,455. For all of the heads positioned between discs, this improvement was more than 3% across all actuator positions 401. This is significant evidence of the importance of the present invention, especially in view of the present concern that track densities are becoming too high to allow track following by existing methods.

By way of review, a first alternative embodiment of the present invention is a method (such as 200) of reducing a flow-induced disturbance on an actuator arm (such as 111) of a disc drive (such as 100). A gas flow (such as 342) generated by a rotating disc (such as 140) is received (e.g. by step 210) and passed along a surface (such as 173) mechanically isolated from the actuator arm(s). The surface redirects the flow to include a substantial inward radial component (e.g. by step 215). Preferably, the redirected flow (such as 344) is expelled toward an inner diameter (such as 361) of the disc (such as 140). The redirected flow (such as 344) is then combined (e.g. by step 225) with a tangent flow (such as 345) so that the combined flow (such as 346) has a net flow direction with an inward radial component (such as 326). The combined flow (such as 346) is redirected again by the actuator arm(s) (such as 111), preferably before it travels ¼ of a revolution of the disc. The redirected flow (such as 348) along the leading edge is shown in FIG. 3. Because the just-combined flow (such as 346) is better aligned with the leading edge (such as 176) of the actuator arm than a tangential flow encountering the actuator arm would be, the flow-induced disturbance on the actuator arm is reduced by the present method.

A second alternative embodiment is a disc drive (such as 100) well-suited for performing the above method (such as 200). The disc drive has multiple discs (such as 140) and an air flow channel (such as 172) positioned upstream of an actuator arm (such as 111). The channel has a horizontal cross-section with a minimum macroscopic radius of curvature (such as 322) greater than R/100 so that the flow is redirected with a minimum drag-induced energy loss. The flow may optionally be passed along textured channel surfaces (with recesses smaller than R/1000 in depth and diameter) so as to reduce drag further. Preferably, the cross-sectional area of the channel is sufficiently uniform along the length of the channel so that, downstream from the channel inlet, flow speed is maintained within 50% all along the curved channel. Alternatively, the flow can be guided so as to remain at a uniform height along the channel(s). The channel is vertically uniform (as shown in FIG. 3) so that the inward radial component of the redirected flow will be larger between the discs than above or below the stack of discs. For ease of implementation, also, the curved surface (such as 173) preferably does not extend above or below any of the major surfaces of the discs (such as 140).

In a third alternative embodiment, the turbulence of (most or all of the flow is increased while the flow is redirected. This increase corresponds with an increase in the Reynolds number of the flow of at least 5%, but should not be so large that the Reynolds number exceeds 3000 as the redirected flow (such as 346) approaches the actuator arm(s). It is believed that this controlled increase in turbulence makes it less likely for structural modes in the actuator arm(s) to develop fully as the flow is redirected again by the actuator arm(s). Note that the depicted channel (at 172) permits this flow change without extending the surface over the disc(s).

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method of reducing a flow-induced disturbance on an actuator arm of a disc drive, comprising only a portion of a gas flow from beyond an outer diameter of a rotating disc of the disc drive along a surface mechanically isolated from the actuator arm and then impinging the redirected portion on an outer edge of the disc in a direction toward an inner diameter of the discs to combine with a non-redirected portion of the gas flow, the combine gas flow thereby deflecting the non-redirected portion of the gas flow toward the inner diameter.

2. The method of claim 1 comprising a second redirecting of the combined flows with the leading edge of the actuator arm before the combined flows travel ¼ of a revolution of the disc.

3. A method of reducing a flow-induced disturbance on an actuator arm of a disc drive, comprising:
   a first redirecting only of a portion of a tangential gas flow generated by a rotation of a disc of the disc drive along a surface mechanically isolated from the actuator arm and toward an inner diameter of the disc; and
   a second redirecting of the combined flow with the leading edge of the actuator arm before the redirected portion of the gas flow travels ¼ of a revolution of the disc to combine with a non-redirected portion of the gas flow, the combine gas flow thereby deflecting the non-redirected portion of the gas flow toward the inner diameter.

* * * * *

UNITED STATES PATENT AND TRADEMARK OFFICE
CERTIFICATE OF CORRECTION

PATENT NO. : 6,995,947 B2  Page 1 of 2
APPLICATION NO. : 09/823677
DATED : February 7, 2006
INVENTOR(S) : Kurt James Korkowski et al.

It is certified that error appears in the above-identified patent and that said Letters Patent is hereby corrected as shown below:

Col. 6, line 6
  replace "or all of"
  with --or all of)--.

Col. 6, line 26
  replace "comprising only"
  with --comprising redirecting only--.

Col., line 31,
  replace "of the discs"
  With --of the disc--.

Col. 6, line 32
  replace "the combine gas"
  with --the combined gas--.

Col. 6, line 41
  replace "redirecting only of"
  with --redirecting of only--.

Col. 6, line 44
  replace "of the disc; and"
  with --of the disc to combine with a non-redirected portion of the gas flow, the combined gas flow thereby deflecting the non-redirected portion of the gas flow toward the inner diameter; and--.

UNITED STATES PATENT AND TRADEMARK OFFICE
CERTIFICATE OF CORRECTION

PATENT NO. : 6,995,947 B2
APPLICATION NO. : 09/823677
DATED : February 7, 2006
INVENTOR(S) : Kurt James Korkowski et al.

It is certified that error appears in the above-identified patent and that said Letters Patent is hereby corrected as shown below:

Col. 6, line 48
replace "disc to combine..."
with --disc.--.

Signed and Sealed this

Eighth Day of August, 2006

JON W. DUDAS
*Director of the United States Patent and Trademark Office*